INVENTORS
Paul Hilpman
George P. Kingsbury
By Morrison, Kennedy Campbell
ATTORNEYS

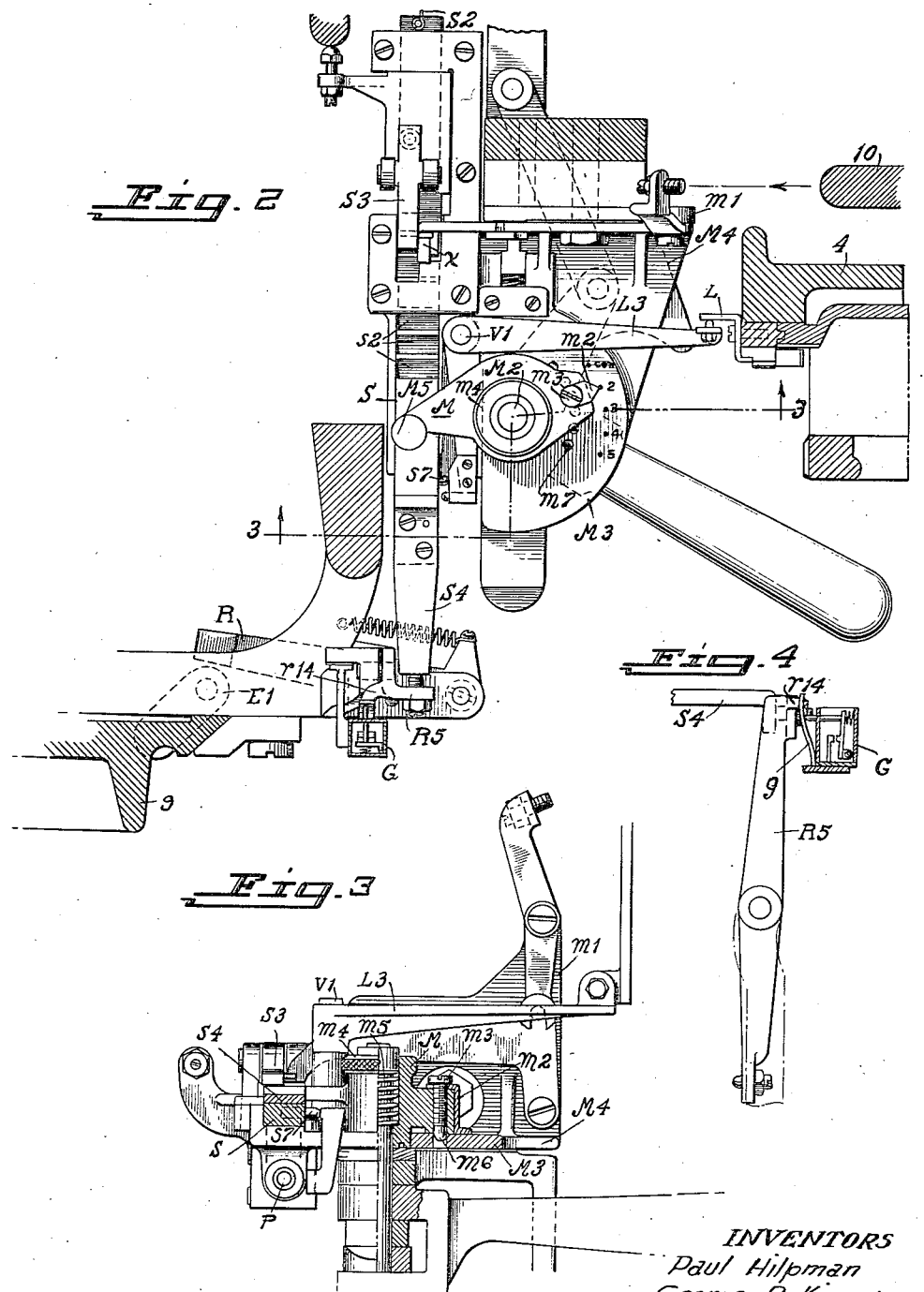

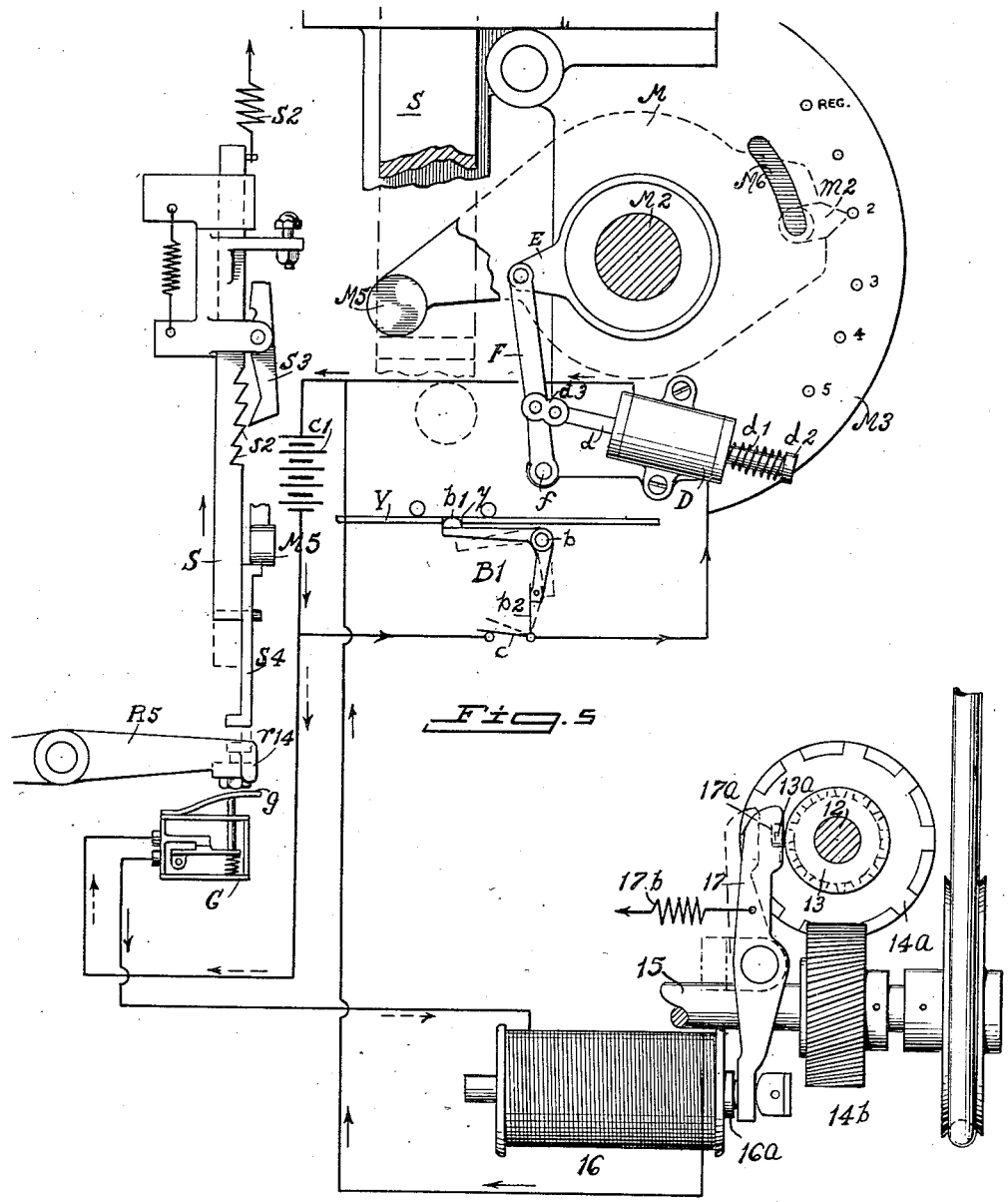

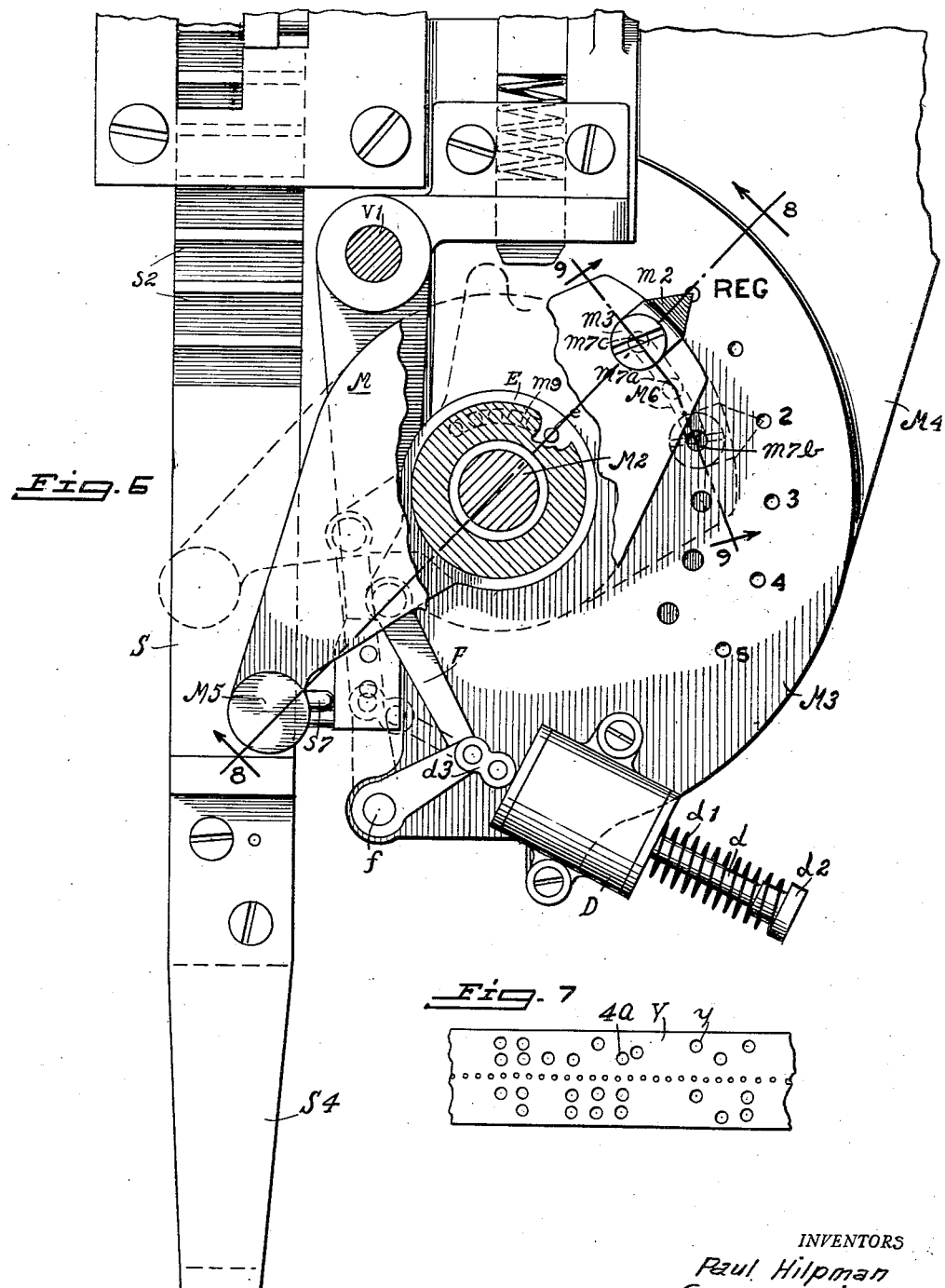

Jan. 21, 1958     P. HILPMAN ET AL     2,820,544
AUTOMATIC RECASTING MECHANISM
Filed Dec. 29, 1954     5 Sheets-Sheet 5
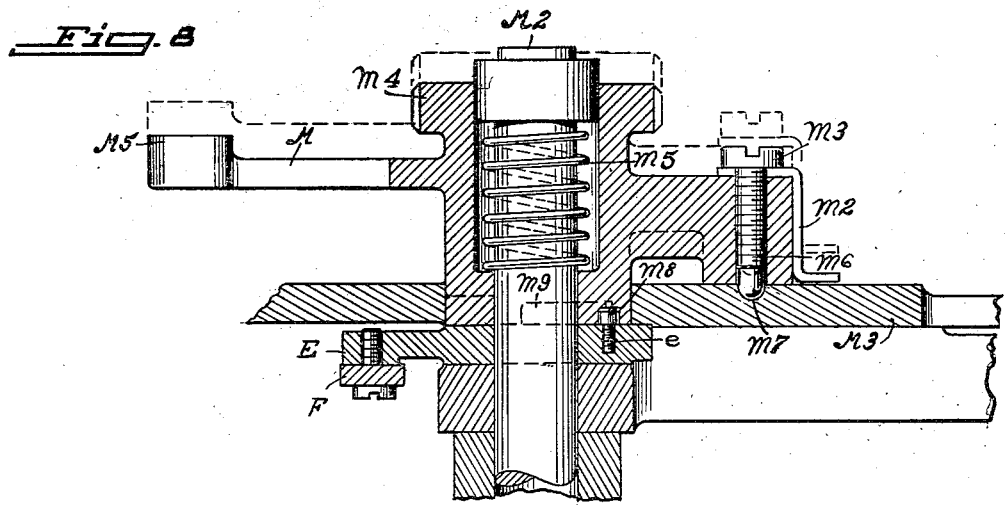
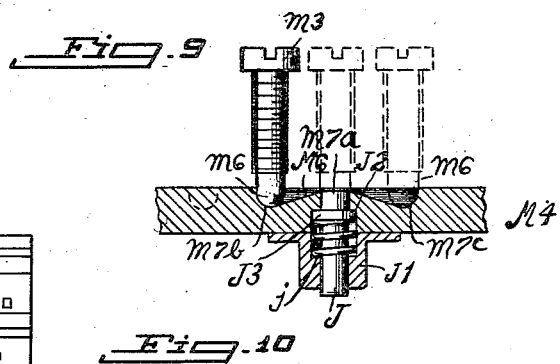
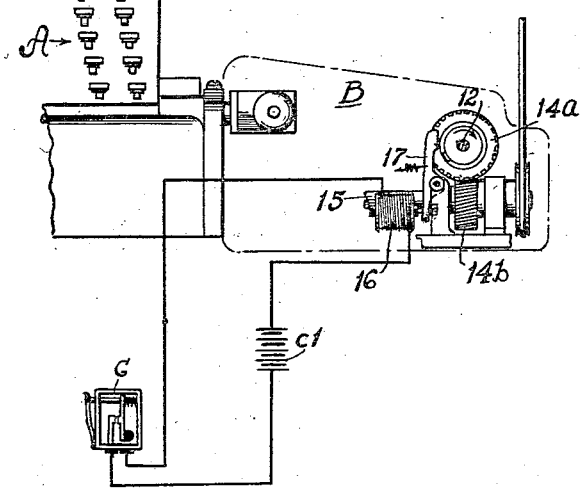
INVENTORS
Paul Hilpman
George P. Kingsbury
BY Morrison, Kennedy Campbell
ATTORNEYS United States Patent Office 2,820,544
Patented Jan. 21, 1958

2,820,544

AUTOMATIC RECASTING MECHANISM

Paul Hilpman, Garden City, and George P. Kingsbury, Hollis, N. Y., assignors to Mergenthaler Linotype Company, a corporation of New York Application December 29, 1954, Serial No. 478,259

22 Claims. (Cl. 199—47)

This invention relates to typographical composing and casting machines, such as "Linotype" machines of the general organization represented in U. S. Letters Patent No. 436,532 to O. Mergenthaler, wherein circulating matrices are released from a magazine in the order in which their characters are to appear in print and then composed in line together with spacers, the composed line transferred to the face of a slotted mold, the mold filled with molten metal to form a slug or type bar against the matrices which produce the type characters thereon, and the matrices and spacers thereafter returned through distributing mechanism to the magazines from which they started. More particularly, the invention relates to machines equipped with mechanism (such as that shown and described in the patent to Paul Hilpman No. 2,235,482) which is adapted, when desired, to cast successively and automatically a plurality of duplicate slugs from each composed line.

Heretofore, it has been the custom to set or condition such recasting mechanism manually and according to the number of duplicate slugs required and thereafter to recondition said mechanism for regular (single slug) casting. While this procedure has proved to be completely satisfactory for machines operated at normal speed and under the control of an operator seated at the keyboard, its application would not be entirely practical to machines operated at high speeds under the control of an automatic unit, such as the well known Teletypesetter tape control unit. Therefore, it quite frequently happens that certain classes of composition, which might well be handled advantageously by these high speed machines, have to be rejected because of the inability to cast duplicate slugs.

The present invention is intended to overcome such difficulties and contemplates a typographical composing and casting machine that is equipped with a tape control unit and also with mechanism which may be conditioned and reconditioned automatically by said unit for casting duplicate slugs or single slugs, as desired. Moreover, the time element involved in the production of blank slugs in a machine so equipped and conditioned for "continuous" casting may be advantageously reduced to a minimum due to the increased speed of machine operation.

In the preferred embodiment illustrated, the recasting mechanism includes a device having an automatically adjustable slecting member which is adapted in one position to permit a normal operation of the machine for regular or single slug casting, and in another position to condition the machine for duplicate slug casting. Electrical means, responsive to a special code perforation in the tape of the control unit, effect the adjustments of said member to and from its normal position whenever a recast of a composed line is indicated.

The accompanying drawings show the invention merely in preferred form and obviously many changes or variations may be made therein without departure from its spirit. It should, therefore, be understood that the invention is not limited to any specific form or embodiment except insofar as such limitations are specified in the appended claims.

Referring to the drawings:

Fig. 2 is a top plan view of the selecting member and the mechanism associated therewith, certain adjacent parts of the machine being shown in section;

Fig. 3 is a vertical section taken on the line 3—3 of Fig. 2 looking in the direction indicated by the arrows;

Fig. 4 is a detail side elevation showing the switch controlled by the fore-and-aft ratchet bar of the recasting mechanism;

Fig. 5 is a diagrammatic view, partly in plan and elevation, showing the automatic means for setting the selecting member of the recasting mechanism in its different adjusted positions, the clutch actuating means of the tape control unit, and the means for operating the fore-and-aft ratchet bar and parts controlled thereby;

Fig. 6 is a top plan view, partly in section, showing in full lines the selecting member and the actuating means therefor in their respective normal positions, and indicating in dotted lines the positions they are caused to assume when said member is automatically adjusted;

Fig. 7 is a detail plan view showing a section of the perforated tape handled by the control unit, and showing a special code formation therein adapted during the advance of the tape to cause an automatic adjustment of the selecting member for the recasting mechanism;

Fig. 8 is a vertical section, taken on the line 8—8 of Fig. 6, showing the operative connection between the selecting member and the actuator therefor;

Fig. 9 is a detail vertical section taken on the line 9—9 of Fig. 6; and

Fig. 10 is a front elevation, partly diagrammatic, showing the electric switch controlled by the recasting mechanism and a portion of the tape control clutch mechanism located adjacent to the keyboard.

Figure 1:
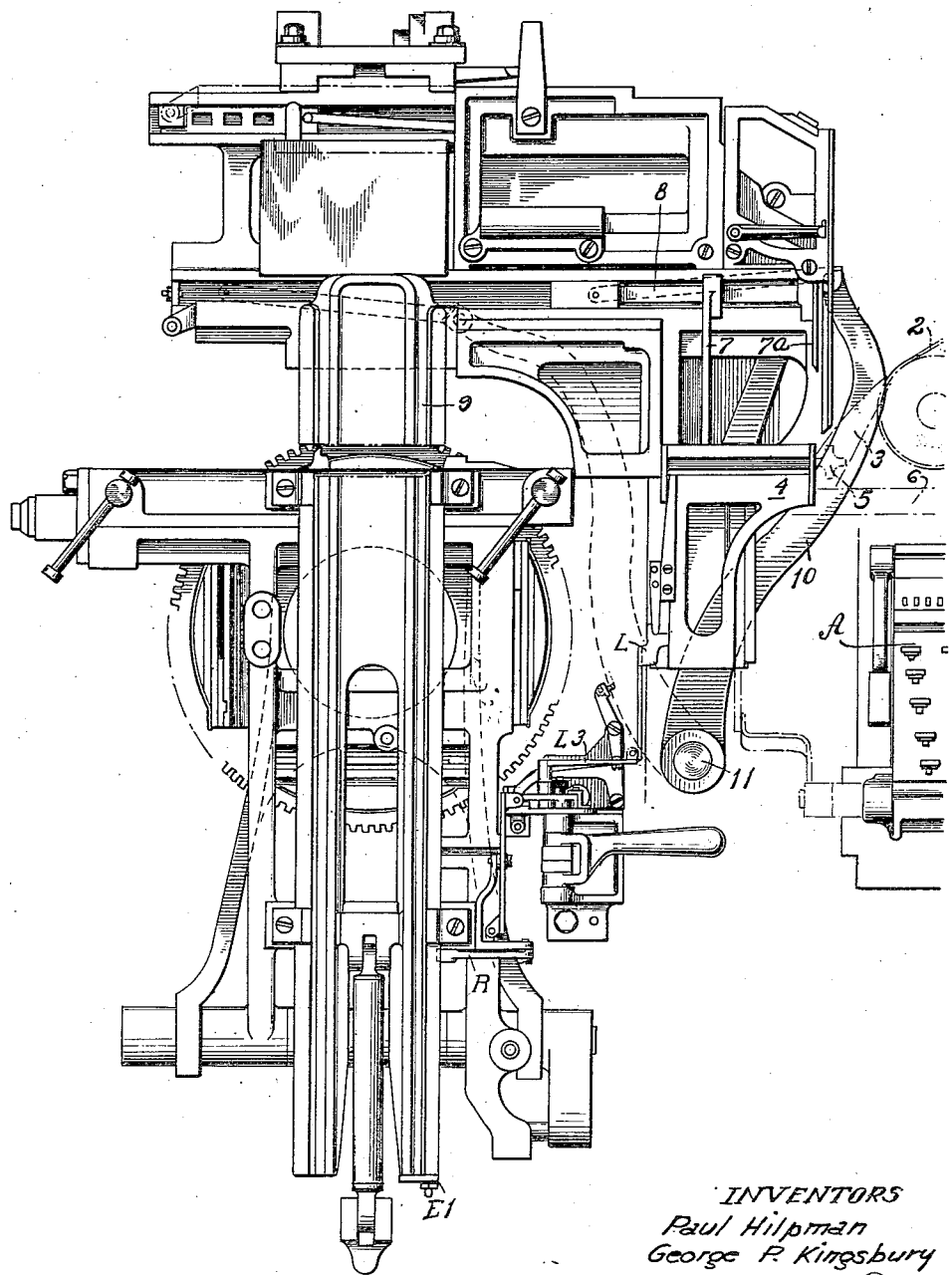
Fig. 1 is a front elevation of a portion of a Linotype machine equipped with the present improvements.

Referring first to Fig. 1: The character bearing matrices are selectively released from their storage magazine (not shown) by the operation of a keyboard A and fall by gravity onto an inclined conveyor belt 2 which discharges them through an assembler chute 3 into an assembling elevator 4. Here the matrices, together with spacebands, are stacked in line one after another in the order of their release by a constantly rotating star wheel 5 and against the upstanding finger of a yielding assembler slide 6. When the composition of the line is completed, the elevator 4 is raised and the line presented between a pair of fingers 7 and 7a, respectively, depending from a line delivery carriage 8 which thereupon is released to transfer the composed line from the elevator into a vertically movable transporter or first elevator 9 and at the same time automatically inaugurate a machine cycle of operation. As the composed line during the active stroke of the carriage 8 is shifted from the assembling elevator 4, the latter is allowed to descend by gravity to its lowermost position in readiness to receive the matrices and spacebands of the next line to be composed. The line delivery carriage is spring actuated and controlled as usual from a cam (not shown) on the main shaft of the machine through the medium of a vertically disposed lever 10 secured at its lower end to a fore-and-aft rock shaft 11.

In the improved machine (see Fig. 10), the operation of the keyboard A and the raising of the assembling elevator 4 are effected automatically by means controlled by the advance of a perforate tape Y (Fig. 7) through the reader mechanism of a control unit B, such as the so-called "Teletypesetter" unit before mentioned and fully shown and described in U. S. Patent No. 2,091,286. However, for present purposes, it will suffice to say that the tape is advanced by a cam actuated ratchet device in a step by step manner from a driven shaft 12 (Fig. 10), and that said shaft in turn is connected through a toothed clutch 13 and a pair of helical gears $14^a$ and $14^b$ to a constantly rotating drive shaft 15 (see also Fig. 5). The clutch 13 is normally held engaged by a compression spring (not shown) and the disengagement thereof is effected automatically by the closing of an electrical circuit through a solenoid 16, which latter is operatively connected to a vertically disposed rocking lever 17 arranged adjacent the clutch, as shown in Fig. 5. At its lower end, the lever 17 is appropriately connected to the core member $16^a$ of the solenoid 16 and at its upper end is formed with an aperture $17^a$ adapted, when the solenoid is energized, to accommodate a stud $13^a$ projecting radially from the shiftable member of the clutch 13. The shape of the aperture $17^a$ is such as to cause and maintain the clutch in its disengaged condition as long as the rocking lever 17 is retained by the solenoid 16 in its active position. However, when the solenoid 16 is deenergized, the lever 17 will be restored by a spring $17^b$ (Fig. 5) to its original (dotted line) position and thus break its engagement with the stud $13^a$ so as to permit a reengagement of the clutch 13 and a normal resumption in the advance of the perforated tape.

The present machine is also equipped with recasting mechanism in the nature of an attachment such as that shown and fully described in the U. S. Patent to Paul Hilpman, No. 2,235,482, wherein a single control member M (Figs. 1 and 2), located at the front of the machine, may be set manually to perform the dual function of conditioning the machine to cast a selected number of duplicate slugs or, alternatively, to condition it to cast an infinite number of duplicate slugs. It may be mentioned here that the reference characters herein employed are the same as those of the Hilpman patent in designating corresponding parts. Thus, in its normal position, the control member M conditions the machine for regular casting and when it has been set for a recasting operation, the movement of the line delivery slide lever 10, in transferring a line from the assembling elevator 4 to the transporter 9, releases a feed device in the form of a ratchet bar S (Figs. 2 and 5) which is retracted by a spring $S^2$ for a given distance according to the setting of the control member. The retraction of the ratchet bar S automatically effects the actuation of a series of levers to cause the engagement of a spring-actuated latch L with a lug on the assembler 4 to lock the latter in its lower or line composing position. At the same time, the retraction of the ratchet bar S effects the location of a stop R in the path of a lug $E^1$ on the transporter 9 to arrest the latter short of its uppermost or line transfer position and thus prevent the removal of the composed line therefrom for distribution, so that the same line will be presented to the mold for casting successive slugs.

As best shown in Figs. 2 and 3, the control member M is mounted on a vertically disposed shaft $M^2$ so as to overlie a plate $M^3$ formed on the horizontal portion of a bracket $M^4$ which also has a vertical portion $m^1$ and is secured to the machine frame. The plate $M^3$ (Figs. 2 and 5) bears the markings "Reg.," "Con.," "2," "3," "4," "5," meaning, respectively, regular machine operation, continuous casing of an infinite number of duplicate slugs, and selective casting of 2, 3, 4 or 5 duplicate slugs as the case may be. One arm of the member M has a pointer $m^2$ fixed by a screw $m^3$ to its free end and adapted to register with one or another of the markings on the plate $M^3$ when said member is set in the selected position. A knurled knob $m^4$ is formed on the member M and the latter is adjusted to different positions by grasping the knob and lifting the member vertically against the tension of a spring $m^5$ mounted on the vertical shaft $M^2$ and reacting against a collar pinned to the upper end of said shaft. This manual operation disengages the unthreaded projecting end $m^6$ of the screw $m^3$ from whichever recess $m^7$ in the plate $M^3$ it may be seated in at the time, so as to free the member M and permit its rotation to any other selected position where it may be released and relocked by the engagement of the screw $m^3$ in a similar recess $m^7$. The setting of the member M with the pointer $m^2$ registering with the selected marking on the plate $M^3$ locates a stop $M^5$ in a definite casting control position as indicated in Fig. 5; said stop being carried by an arm of the member M extending in a direction diametrically opposite to the one which carries the pointer $m^2$.

A sliding pawl $S^3$ (Figs. 2 and 5), associated with the ratchet bar S, is mounted to reciprocate relatively thereto and is moved in one direction by the forward movement of the metal pot (not shown) prior to casting, and in the opposite direction after casting by the pull of the tension spring $S^2$ which is adapted to function as the metal pot is moved back to its original position. The pawl $S^3$ performs two functions: First, when moved forwardly during the first machine cycle, it carries with it a fore-and-aft slide rod P (Fig. 3) which becomes engaged with a displaceable finger (not shown) for locking it against retrograde movement and is operatively connected, through mechanism normally under manual control, for tripping the usual stop dog in starting the operation of the machine; and while the rod P is held in its forward position as stated, the tripping mechanism is set to prevent the machine from being stopped automatically at the end of the first cycle. Second, each time the pawl $S^3$ is actuated by the forward movement of the metal pot, it engages one of a series of teeth $S^2$ on the ratchet bar S and moves the latter forwardly against the tension of its retracting spring a distance equal to the space between two adjacent teeth, a detent X (Fig. 2) being provided to hold the ratchet bar in the position to which it has been moved so that, as the metal pot recedes, the pawl $S^3$ is free to be retracted for engagement with the next tooth on the bar.

During the casting of the last of the selected number of duplicate slugs, the pawl $S^3$ imparts the final movement to the ratchet bar S and returns it to its original position, whereupon said bar in turn effects the operation of certain associated parts of the mechanism, including: a vertical rock shaft $V^1$ (Figs. 2 and 3) having an arm $L^3$ to unlock the assembling elevator 4; a vertically disposed lever $R^5$, to remove the stop R from the path of the lug $E^1$ on the transporter or first elevator 9; and means controlled by the rock shaft $V^1$ for releasing the slide rod P (Fig. 3) so as to cause the machine to come to rest at the end of its cycle. As thus far described, the parts of the tape control and the recasting mechanism are or may be the same as those shown and fully described in the aforementioned Patents Nos. 2,091,286 and 2,235,482, to which reference may be made if desired.

According to the present invention and as clearly illustrated in Figs. 5, 6 and 7, the reading mechanism of the tape control unit B (indicated by the broken lines Fig. 10) includes a small bell crank lever $B^1$ pivotally mounted on a fixed cross rod $b$ disposed directly beneath and transversely of the perforated tape Y. The longer horizontally disposed arm of the lever $B^1$ is formed at its free end with a protuberance $b^1$ (Fig. 5) which is held under the tension of a light wire spring $b^2$ normally engaged with the lower face of the tape so that, during the intermittent advance thereof, the protuberance $b^1$ will be allowed to engage an aperture or code perforation $y$ formed in the tape and located preferably adjacent the one employed to control the operation of the assembling elevator. As a matter of fact, the engagement of the protuberance $b^1$ with the perforation $y$ takes place as the tape is momentarily arrested through the location of a code perforation $4^a$ (Fig. 7) for initiating the upward movement of the elevator 4; and such condition of the parts in the present instance is maintained, in a manner about to be made clear, until the second slug has been cast during the recasting cycle.

The other arm of the bell crank lever $B^1$ is operatively connected to an electric switch C controlling a circuit from a battery $C^1$ (or other source of electric current supply) to a solenoid D, and the latter in turn is operatively connected to the selecting member M of the recasting mechanism through the medium of an actuator E for said member and a toggle arrangement F attached to one end of the core element $d$ of the solenoid D. As best shown in Figs. 5 and 6, the core element $d$ extends through and sufficiently beyond the solenoid D to accommodate a compression spring $d^1$ which is seated against a collar $d^2$ at the opposite end of the core element and reacts against the contiguous end of the solenoid. One member of the toggle F is fulcrummed on a stud $f$ in the fixed bracket plate $M^3$ before mentioned; and to facilitate the proper operation of the parts during the endwise movement of the element $d$, the connection between said element and the toggle is established by a short link $d^3$.

A second electric switch G, controlled by the endwise movement of the fore-and-aft ratchet bar S (Figs. 2 and 5), is also employed to close a circuit from the battery $C^1$ to the solenoid 16 previously mentioned and which is operatively connected to the vertical lever 17 associated with the toothed clutch 13. The switch G is provided with an exterior actuating finger $g$, and when the machine is conditioned for regular casting, the switch is sustained in its open or inactive state by a forward extension $S^4$ of the ratchet bar S, said extension acting through the medium of a lug $r^{14}$ projecting in the same direction from the upper end of the vertical lever $R^5$ and normally engaging said finger. However when the machine is conditioned for recasting (Fig. 5), and the ratchet bar S is allowed to recede, a circuit will be established by the switch G from the battery $C^1$ to the solenoid 16 and insure the disengagement of the clutch 13 and the arrest in the advance of the tape Y until the end of the recasting period. Thereupon, the switch G will be reopened by the return movement of the ratchet bar S to its normal position so as to deenergize the solenoid 16 and thus permit a resumption in the advance of the tape Y by the reengagement of the clutch 13. As a result, the small bell crank lever $B^1$, through the disengagement of its protuberance $b^1$ from the special perforation $y$ in the tape Y, will be actuated to open the electric switch C and thus break the circuit to the solenoid D, permitting the spring $d^1$ thereof to collapse the toggle F and, through the actuator E, restore the selecting member M to its normal position (Fig. 6) for regular casting. While the machine is conditioned for recasting, the assembling elevator 4, as already stated, will be locked against upward movement by the latch L which is adapted, during the last recasting cycle, to be released by a stud $S^7$ on the ratchet bar S as the latter completes its return forward movement (Fig. 2). At the same time, the stop R through the medium of the vertical lever $R^5$ will be moved out of the path of the transporter 9 so as to permit the latter to partake of its full upward movement to the line transfer position during the next succeeding cycle.

As hereinbefore stated, the selecting member M is capable of manual as well as automatic adjustment to condition the machine for recasting purposes, and such adjustments are effected according to the appropriate markings on the semi-circular portion of the bracket plate $M_3$ and the registry therewith of the pointer $m^2$ on the selecting member. In the present instance, however, and to avoid any objectionable delay in the normal output of the machine, the automatic adjustment of the selecting member M from "rgeular" casting position to recasting position has been limited to one that will cause the production of two duplicate slugs only for any selected composed line that may be indicated on the tape by the special code perforation $y$. To this end, therefore, the actuator E for the selecting member M (Fig. 8) is arranged directly beneath said member upon the supporting bracket $M^4$ and is operatively connected thereto through the medium of a vertical stud $e$ which rises from the actuator and normally engages in a corresponding recess $m^8$ formed in the lower face of the selecting member. At such times, the selecting member M is adapted to be located in its inactive position for "regular" casting (as indicated in Figs. 6 and 8), and when a manual adjustment of the selecting member for recasting is desired, it first is raised as usual in opposition to its compression spring $m^5$ to disengage the protruding end of the screw $m^3$ from a recess $m^7$ in the bracket plate $M^4$, and then turned for the proper setting where it is released and sustained against displacement by the engagement of the screw with one of the other recesses $m^7$. During these manual adjustments and as the member M is raised, it will also break its engagement with the vertical stud $e$ of the actuator E; and to permit the proper reseating of the selecting member, in the manner just stated, the latter is formed in its lower end with a semi-annular recess $m^9$ (Figs. 6 and 8), which is sufficiently long to accommodate said stud in any of its adjusted positions. On the other hand, and when the selecting member M again is restored to its normal position for rgeular casting, the screw $m^3$ is adapted to seat at one end of a finished arcuate depression $M^6$ formed in the bracket plate $M^4$ and, at the same time, the stud $e$ is allowed to reestablish the operative connection between the selecting member and its actuator E.

Preferably, the bottom surface of the depression $M^6$ (Fig. 9) is inclined downwardly in opposite directions from a recess $m^{7a}$ (appropriately labeled for "continuous" casting) to the two adjacent recesses $m^{7b}$ and $m^{7c}$ labeled respectively "2" (two duplicate slugs) and Reg. (regular casting), see Fig. 6. Consequently, when the selecting member M is automatically adjusted by means of the actuator E from the "regular" to the recasting position "2" as the solenoid D is energized, the lower end of the locating screw $m^3$ of the selecting member will be held in the recess $m^{7b}$ and against one end wall of the depression $M^6$ by the straightening out of the toggle F in the manner before stated. Conversely, when the solenoid D is deenergized and the selecting member M restored to its original position for regular casting by the collapsing of the toggle F, the lower end of the screw $m^3$ in like manner will be held in the corresponding recess $m^{7c}$ and against other end wall of the depression $M^6$ by the solenoid spring $d^1$.

Since the locating recess $m^{7a}$ for continuous casting happens to be disposed midway between the two recesses $m^{7b}$ and $m^{7c}$ (Figs. 5 and 9), and although the snaplike or rapid movement of the parts as they are caused to partake of their automatic adjustment may not prove objectionable, precautionary measures have been observed to insure the passage of the locating screw $m^3$ uninterruptedly from one position to the other. To this end and as best shown in Fig. 9, a sustaining element, in the form of a small spring plunger J, is provided and mounted transversely in the bracket plate $M^4$ so as to be readily displaced by the lower end of the locating screw $m^3$ in the selecting member M when the latter is adjusted manually to the "continuous" casting position. The plunger J is slidably mounted for vertical movement in a small auxiliary bracket $J^1$ secured to the underside of the fixed plate $M^4$ and normally is sustained, under the pressure of a relatively strong compression spring $J^2$, with its upper end flush with the bottom surface of the depression $M^6$. In diameter, the plunger J preferably coincides with that of the lower protruding end of the locating screw $m^3$ so that it may be displaced thereby in opposition to the spring $J^2$ as the selecting member M is released after being turned to the continuous casting position. The bracket $J^1$ is appropriately reamed to accommodate the spring $J^2$ which serves, by reacting against a collar $J^3$ formed on the plunger J and an opposing stop shoulder $j$ of the bracket, to locate the plunger vertically in its normal position. Therefore, while the plunger J during the rapid movement of the selecting member M at the time of its automatic adjustment will direct said member across the intervening recess $m^{7a}$, it (the plunger) will readily yield under the greater pressure of the spring $m^5$ whenever the selecting member is manually adjusted and released at the "continuous" casting station directly over the plunger J.

As previously stated, the invention is not limited to the specific form or embodiment herein shown and described. For example, mechanical means in lieu of electrical means may be employed to effect the automatic adjustments of the selecting member M under control of the perforated tape.

What is claimed is:

1. In or for a typographical composing and casting machine, the combination of an automatic control unit to automatically inaugurate a machine cycle of operation after a line is completely composed, adjustable selecting means for conditioning the machine to operate uninterruptedly for more than one cycle and also stop the operation of the control unit to prevent the composition of the next line prior to the last casting cycle, and means controlled by said unit for automatically effecting the adjustments of the selecting means.

2. A combination according to claim 1, wherein the unit controlled means includes a spring-actuated clutch governed in its operation by the adjustments of the selecting means.

3. A combination according to claim 1, wherein the selecting means includes a selecting member adapted in its normal position to condition the machine for regular casting.

4. A combination according to claim 1, wherein the unit controlled means comprises an electrical solenoid operatively connected to the selecting member.

5. In or for a typographical composing and casting machine, the combination of a tape control unit having mechanism to automatically inaugurate a machine cycle of operation after a line is completely composed and at the same time stop the advance of the tape, an adjustable selecting member for conditioning the machine to operate uninterruptedly for more than one cycle, an electrical solenoid controlled by the advance of the tape for effecting an adjustment of the selecting member as the first machine cycle is inaugurated, and an electric switch controlled by the conditioning mechanism for closing a circuit to prevent a resumption in the advance of the tape until the casting operation of the last machine cycle is completed.

6. A combination according to claim 5, wherein the mechanism of the tape control unit includes a spring-actuated clutch for effecting the advance of the tape, and a separate electrical solenoid arranged in the circuit and controlled by said switch for in turn controlling the engagement and disengagement of the clutch.

7. A combination according to claim 6, including means responsive to the reopening of the electric switch during the last casting cycle to cause deenergization of the separate solenoid and reengagement of said clutch so as to permit a resumption in the advance of the tape and composition of the next line before the last recasting cycle is completed.

8. In or for a typographical composing and casting machine equipped with recasting mechanism, the combination of a tape control unit, and means controlled by the tape control unit for automatically setting said mechanism to inaugurate a recasting machine cycle for any preselected composed line.

9. A combination according to claim 8, wherein the tape of the tape control unit is formed with separate rows of perforations to control the composition and punctuation of the lines, and wherein said tape is also formed with a special perforate symbol to control the inauguration of the recasting cycle.

10. In or for a typograhpical composing and casting machine equipped with recasting mechanism, the combination of a tape control unit, and unitary means controlled by the tape control unit for automatically conditioning said mechanism so as first to inaugurate a recasting operation and then, after the recasting period, automatically recondition the mechanism to permit the machine to resume its normal operation for regular casting.

11. A combination according to claim 10, wherein the recasting mechanism includes a selecting member capable of adjustment to different positions according to the number of slugs to be cast from a composed line, and an actuator controlled by said unitary means for effecting certain adjustments of the selecting member automatically.

12. A combination according to claim 11, wherein the unitary means comprises an electrical solenoid having its core member operatively connected to the actuator.

13. A combination according to claim 12, wherein the solenoid is arranged in an electrical circuit controlled by the tape control unit.

14. A combination according to claim 11, including means whereby an operative connection between the selecting member and the actuator is automatically established when said member is manually restored after an adjustment to its normal position for "regular" casting.

15. In or for a typographical composing and casting machine, the combination of a tape control unit having mechanism to automatically inaugurate a machine cycle of operation after a line is completely composed, and unitary means controlled by the tape control unit for conditioning the machine to operate uninterruptedly for a preselected number of cycles and also stop the advance of the tape to prevent composition of the next line prior to the last casting cycle.

16. A combination according to claim 15, wherein the mechanism of the tape control unit includes a spring-actuated clutch, and wherein said conditioning means includes an adjustable selecting member operable to cause a disengagement of the clutch automatically at the start of the first casting cycle.

17. In a typographical composing and casting machine, the combination of a keyboard for selectively releasing matrices from a storage magazine, an assembling elevator wherein the matrices are composed in line, an automatic control unit having mechanisms for automatically operating the keyboard and for raising the assembling elevator to inaugurate a machine cycle of operation, means governed by said control unit for conditioning the machine to operate for a preselected number of cycles, and means controlled by the conditioning means for incapacitating said mechanisms of the control unit while the machine is so conditioned.

18. A combination according to claim 17, wherein the conditioning means includes an adjustable selecting member adapted when moved to its normal position to recondition the machine for regular casting and at the same time permit the automatic operation of the keyboard as well as the assembling elevator by said mechanisms of the control unit.

19. A combination according to claim 18, wherein the conditioning mechanism includes a fore-and-aft spring-actuated ratchet bar, and wherein the selecting member is provided with a stop element adapted in the different adjusted positions of said member to sustain the ratchet bar endwise in corresponding positions against the tension of its actuating spring.

20. In a typographical composing and casting machine equipped with a keyboard for selectively releasing matrices from a storage magazine, an assembling elevator wherein the matrices are composed in line and a vertically movable line transporter to carry the line to and from the casting position; the combination with an automatic control unit having mechanism for automatically operating the keyboard as well as mechanism for raising the assembling elevator so as to inaugurate a machine cycle of operation and permit the delivery of the composed line therein to the transporter, and means governed by said control unit for conditioning the machine to operate for a definite number of cycles and at the same time incapacitate said mechanisms of the control unit during the multiple cycle period.

21. A combination according to claim 20, including a line transfer slide controlled by the transporter as it completes its upward movement after the casting operation, and wherein the conditioning means includes a stop element movable automatically to and from active position for limiting the upward movement of the transporter to prevent the removal of the line therefrom prior to the last casting cycle.

22. A combination according to claim 20, wherein the conditioning means also includes an automatically controlled safety latch for locking the assembling elevator in its lower position while the mechanisms of the control unit are unconditioned.

References Cited in the file of this patent

UNITED STATES PATENTS

| | | |
|---|---|---|
| 2,086,547 | Goetz | July 13, 1937 |
| 2,091,286 | Krum et al. | Aug. 31, 1937 |
| 2,235,482 | Hilpman | Mar. 18, 1941 |
| 2,464,601 | Nichols | Mar. 15, 1949 |